(12) United States Patent
Youngworth

(10) Patent No.: US 8,438,360 B2
(45) Date of Patent: May 7, 2013

(54) DISTRIBUTED STORAGE THROUGH A VOLUME DEVICE ARCHITECTURE

(75) Inventor: Christopher Youngworth, San Jose, CA (US)

(73) Assignee: Symantec Corporation, Mountain View, CA (US)

(*) Notice: Subject to any disclaimer, the term of this patent is extended or adjusted under 35 U.S.C. 154(b) by 364 days.

(21) Appl. No.: 12/713,621

(22) Filed: Feb. 26, 2010

(65) Prior Publication Data

US 2011/0125951 A1 May 26, 2011

Related U.S. Application Data

(60) Provisional application No. 61/263,761, filed on Nov. 23, 2009.

(51) Int. Cl.
*G06F 12/00* (2006.01)

(52) U.S. Cl.
USPC ................ 711/170; 711/6; 711/203; 711/206

(58) Field of Classification Search .............. 711/6, 203, 711/206, 170
See application file for complete search history.

(56) References Cited

U.S. PATENT DOCUMENTS

| 2006/0248528 | A1  | 11/2006 | Oney et al. |
| 2007/0156957 | A1* | 7/2007  | MacHardy et al. ............ 711/114 |
| 2007/0233997 | A1* | 10/2007 | Kobara ......................... 711/170 |
| 2008/0082977 | A1  | 4/2008  | Araujo et al. |
| 2008/0104359 | A1* | 5/2008  | Sauer et al. ................... 711/202 |
| 2008/0104589 | A1  | 5/2008  | McCrory et al. |
| 2008/0133863 | A1* | 6/2008  | Boggs et al. .................. 711/170 |
| 2009/0070771 | A1  | 3/2009  | Yuyitung et al. |
| 2010/0107162 | A1  | 4/2010  | Edwards et al. |
| 2011/0179214 | A1* | 7/2011  | Goggin et al. .................... 711/6 |

* cited by examiner

*Primary Examiner* — John Lane
(74) *Attorney, Agent, or Firm* — Wilmer Cutler Pickering Hale and Dorr LLP

(57) ABSTRACT

A volume manager I/O method and system. The method includes determining a storage extent mapping of storage functionality of a plurality of storage devices and generating a logical disk extent based on the storage extent mapping. The logical disk extent is exported to a volume device component that is communicatively coupled to implement I/O for an application. An I/O request from the application is received via the volume device component. The I/O request is executed in accordance with the logical disk extent.

20 Claims, 10 Drawing Sheets

DISTRIBUTED STORAGE THROUGH A VOLUME DEVICE ARCHITECTURE

RELATED U.S. APPLICATIONS

This application claims the benefit of and priority to the provisional patent application, Ser. No. 61/263,761, entitled "SEAMLESS INSERTION OF DATA TRANSFORMATIONS INTO DEVICE DRIVER TRANSPORT STREAMS," with filing date Nov. 23, 2009, and hereby incorporated by reference in its entirety.

CROSS REFERENCE TO RELATED APPLICATIONS

This Application is related to the U.S. patent application "SYSTEM AND METHOD FOR AUTHORIZATION AND MANAGEMENT OF CONNECTIONS AND ATTACHMENT OF RESOURCES", by Youngworth, filed on Feb. 26, 2010, Ser. No. 12/713,640, which is incorporated by reference in its entirety.

This Application is related to the U.S. patent application "SYSTEM AND METHOD FOR VIRTUAL DEVICE COMMUNICATION FILTERING", by Youngworth, filed on Feb. 26, 2010, Ser. No. 12/713,754, which is incorporated by reference in its entirety.

FIELD OF THE INVENTION

The present invention is generally related to digital computer, more particularly, to a system and method for periodically replicating data in volumes.

BACKGROUND OF THE INVENTION

Products exist today that emulate disk I/O devices in a virtual machine setting. Likewise there are storage products that provide volumes to applications in distributed settings of all types. Both virtual disk and virtual storage products share many similar implementation challenges because both types of products create virtual runtime device personalities on top of what are perceived to be physical resources. They also share the same basic environments: an application context where I/O requests are received and processed and a system context where I/O actions are undertaken on the device layer.

In a hypervisor setting fundamental performance and integration problems arise because the system and application environments are not the same for disk emulation and volume storage products. Disk emulation device system context is in the hypervisor and its application space is the virtual machine kernel mode.

With volume storage, existing products are placed either in a host virtual machine as a modification of the physical resource backing the emulated device or in the guest virtual machine where it modifies the perceived physical device. In either case the volume storage product's system environment is the virtual machine kernel mode. The result of this situation is a performance sapping, cascaded software stack. Little information is passed back and forth on disk resource topologies and so tight I/O scheduling is impossible.

Further, large numbers of unnecessary and expensive context switches are made to satisfy the communication requirements of the boundary interface between volume storage and emulated device. This boundary is wholly an artifact of the awkward interplay between the two implementations. Little attempt has been made to date to reconcile the two products.

Both products are complex and combining them will require storage management functionality in the hypervisor.

Putting additional function in the average modern hypervisor is ill-advised because its internal interfaces are poorly abstracted and addition of broader device emulation puts a strain on system definition and reliability.

There are a number of challenges to delivering volume storage to a virtual machine. These challenges fall into two categories, data transport and system management. Data transport challenges are experienced in two ways: I/O scheduling and system overhead.

With regard to I/O scheduling, volume storage subsystem must make multiple individual reads and writes on different physical devices in order to complete a single application I/O request. Performance suffers when there is skew between the completions of the disk I/O's. For this reason, commands for individual disks that are associated with an application volume request are made at the same time. When emulated devices are placed between the volume device and the physical hardware, unwanted rescheduling of individual disk I/O commands is possible. This can wreak havoc with performance even if all of the requests are coming from a single virtual machine. Worse still is the case of multiple virtual machines sharing space on the same set of disks. The proper scheduling of requests coming from multiple virtual machines is unmanageable for complex sharing arrangements, because the physical device scheduling layer has no knowledge of the volume device topology.

SUMMARY OF THE INVENTION

Embodiments of the present invention provide a method for implementing a common volume manager scheduling functionality that implements coordinated optimal I/O through simultaneous knowledge of virtual guest provisioning policy, initial guest volume request and physical resource topology.

In one embodiment, the present invention is implemented as a volume manager I/O method. The method includes determining a storage extent mapping of storage functionality of storage resources and generating a logical disk extent based on the storage extent mapping. The logical disk extent is exported to a volume device component that is communicatively coupled to implement I/O for an application. An I/O request from the application is received via the volume device component. The I/O request is executed in accordance with the logical disk extent.

In one embodiment, the logical disk extent is used to export volume layout information to the application.

In one embodiment, the volume layout information comprises one or more volume policy options.

In one embodiment, the volume device component is a virtual transport bus volume device component.

In one embodiment, I/O requests are received from a plurality of different applications via a corresponding plurality of volume device components, and wherein the plurality of I/O requests are pooled to implement an optimal overall I/O scheduling.

In one embodiment, the optimal overall I/O scheduling is based on knowledge of each of the volume device components and knowledge of a physical resource topology of the storage resources.

In one embodiment, the optimal overall I/O scheduling is based on a provisioning policy, and wherein the provisioning policy is operable for alteration via real-time management input.

In one embodiment, I/O signal requests and data completion interrupts are suppressed while executing a plurality of I/O request to implement streaming I/O.

In one embodiment, wherein a shared memory is used to implement a plurality of queues to support input and output between for context of the application.

In one embodiment, the present invention is implemented as computer readable storage medium having stored thereon, computer executable instructions that, if executed by a computer system cause the computer system to perform a I/O method. The method includes instantiating a volume device manager within a hypervisor context, and determining a storage extent mapping of storage functionality of storage resources. The method further includes generating a plurality of logical disk extents based on the storage extent mapping, and exporting the logical disk extents from the volume device manager to a plurality of volume device components that are communicatively coupled to implement I/O for a plurality of applications, wherein the volume device components and the applications execute as respective virtual machine guests. The method further includes receiving a plurality of I/O request from the applications via the volume device components, pooling the I/O requests to implement an optimal overall I/O scheduling, and executing the I/O requests in accordance with the I/O scheduling.

In one embodiment, the present invention is implemented as a volume device manager system. The volume device manager system includes a computer system having a processor coupled to a computer readable storage media and executing computer readable code which causes the computer system to implement a volume device manager. The volume device manager instantiates a volume device manager within a hypervisor context, and determines a storage extent mapping of storage functionality of storage resources. The volume device manager generates a plurality of logical disk extents based on the storage extent mapping, and exports the logical disk extents from the volume device manager to a plurality of volume device components that are communicatively coupled to implement I/O for a plurality of applications. The volume device components and the applications execute as respective virtual machine guests. Within the policy dictates, storage may be arranged into logical disks to be provided to virtual device components or may be provided in raw form. The volume device component is free to arrange its virtual disk resources into volumes. The volume topology is communicated to the volume manager, setting up the context for the subsequent I/O traffic. The volume device manager receives a plurality of I/O request from the applications via the volume device components, pools the I/O requests to implement an optimal overall I/O scheduling, and executes the I/O requests in accordance with the I/O scheduling.

In one embodiment, upon receiving a read request from the application to access one of the set of data objects and the one data object is not resident with the second snapshot, the one data object is retrieved from the first snapshot.

In one embodiment, upon receiving a read request from the application to access one of the set of data objects and said one data object is yet to be transferred by the replication source, the one data object is received from the replication source via an out of order transfer.

In one embodiment, write accesses from the application to the one data object are implemented by using a writable snapshot of the second snapshot.

In one embodiment, read accesses from the application to the one data object are paused until the one data object is retrieved from the first snapshot.

In one embodiment, metadata is used to identify the set of data objects from the replication source that have been modified.

In one embodiment, the metadata comprises changed block address ranges.

In one embodiment, metadata describing the set of data objects is received prior to receiving the set of data objects in their entirety.

In one embodiment, a third snapshot is generated and an application is mounted on the third snapshot prior to completion of the replication of the third snapshot.

In one embodiment, the present invention is implemented as a computer readable storage medium having stored thereon, computer executable instructions that, if executed by a computer system cause the computer system to perform a method that includes receiving a first snapshot at a first time from replication source, and receiving a set of data objects from the replication source that have been modified during a time period between the first time and a subsequent second time. A second snapshot is generated at the second time on the replication source by using the metadata. An application is then mounted onto the second snapshot prior to receiving the set of data objects in their entirety.

In one embodiment, the present invention is implemented as a volume replication system. The system includes a computer system having a processor coupled to a computer readable storage media and executing computer readable code which causes the computer system to implement a checkpoint manager module. The checkpoint manager module receives a first snapshot at a first time from a replication source, and receives a set of data objects from the replication source that have been modified during a time period between the first time and a subsequent second time. The module generates a second snapshot at the second time on the replication source by using the set of data objects, and allows an application to use the second snapshot prior to the set of data objects being received to completion.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
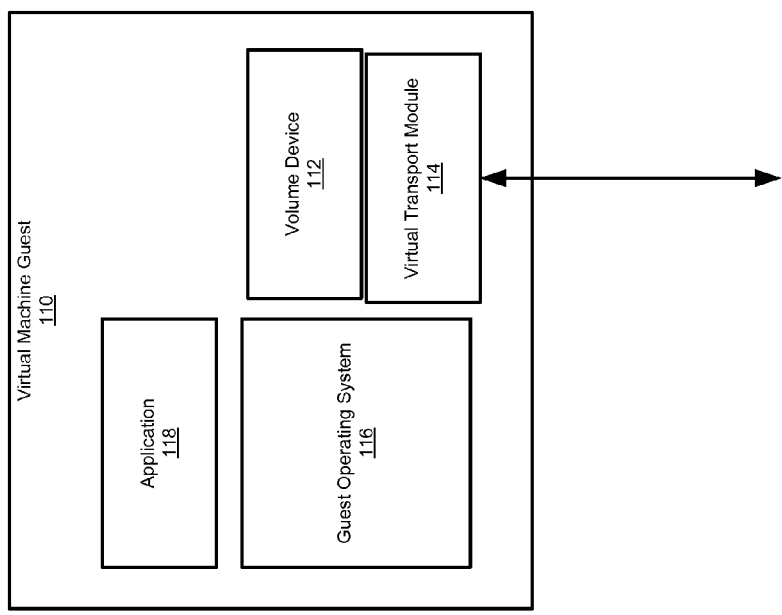
FIG. 1 shows a diagram of a virtual transport volume device in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "pooling" or "storing" or "scheduling" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1 shows a diagram of a virtual transport volume device in accordance with one embodiment of the present invention. As depicted in FIG. 1, a virtual machine guest 110 is shown. The virtual machine guest 110 includes an application 118 running in conjunction with a guest operating system 116. The guest operates system performs input and output via a volume device 112 and a virtual transport module 114.

As depicted in FIG. 1 embodiment, embodiments of the present invention implement a virtual transport volume device. While a series of disks, virtual or raw may be exported to a guest, a virtual transport volume device shares notional volumes with the guest as opposed to a set of disks. The guest volume component is free to participate in the organization of the exported disk resource into volume arrangements. The arrangement is then communicated to the volume manager and I/O requests are then made against the derived entity. The guest makes its requests on the synthesized volume device space. In this way policy options are preserved for the guest, allowing it traditional control over volume management while gaining the advantages of aggregated I/O requests. The virtual transport module 114 implements a virtual transport bus between the guest 110 and the underlying disk layout of the host.

The volume device 112 also benefits from being within the guest context in that it gains direct knowledge of the volume request made by the guest 110. In this way the volume device 112 can implement policy based on knowledge of the provisioning contracts for each of a number of guests, the guests informed requests, the data center level real-time inputs, and the limitations of its physical storage resources.

Figure 2:
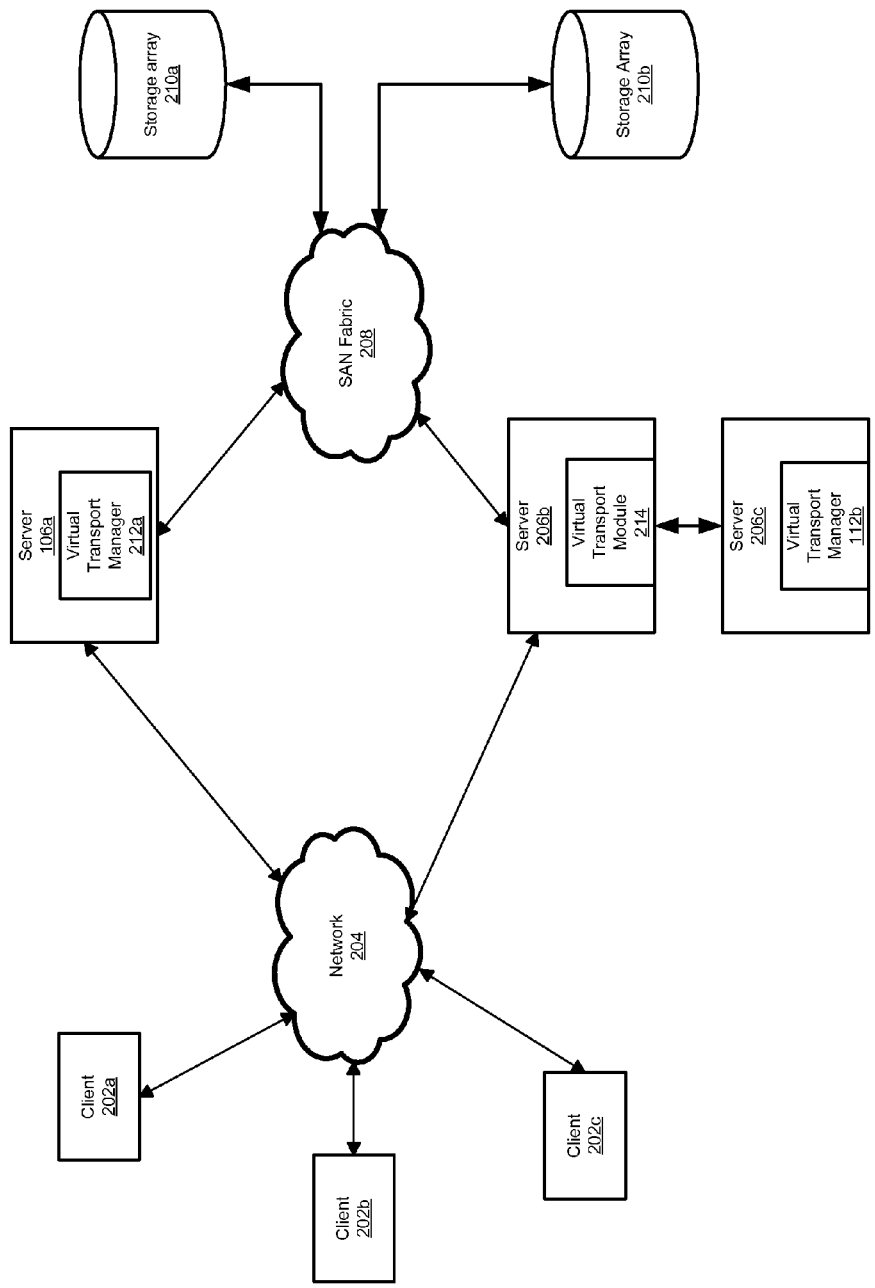
FIG. 2 shows a block diagram of an exemplary operating environment in accordance with one embodiment of the present invention.
Figure 3:
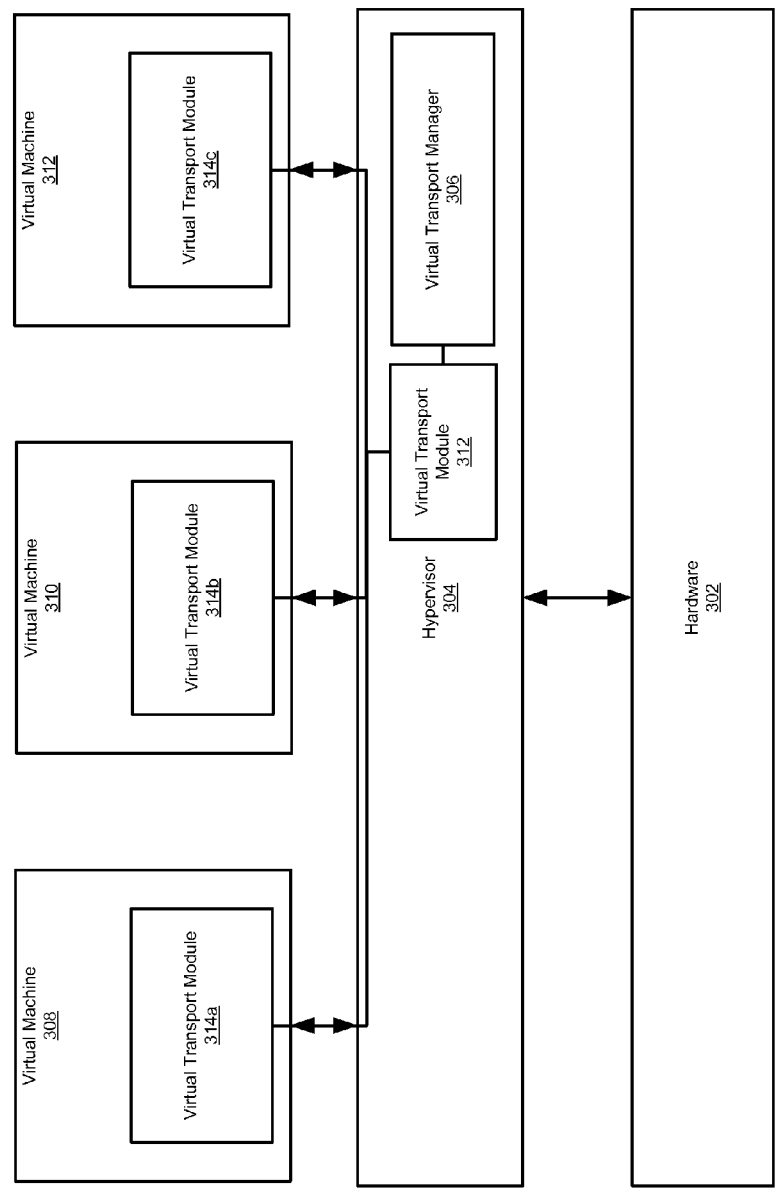
FIG. 3 shows a block diagram of an exemplary virtual environment in accordance with one embodiment of the present invention.
Figure 4:
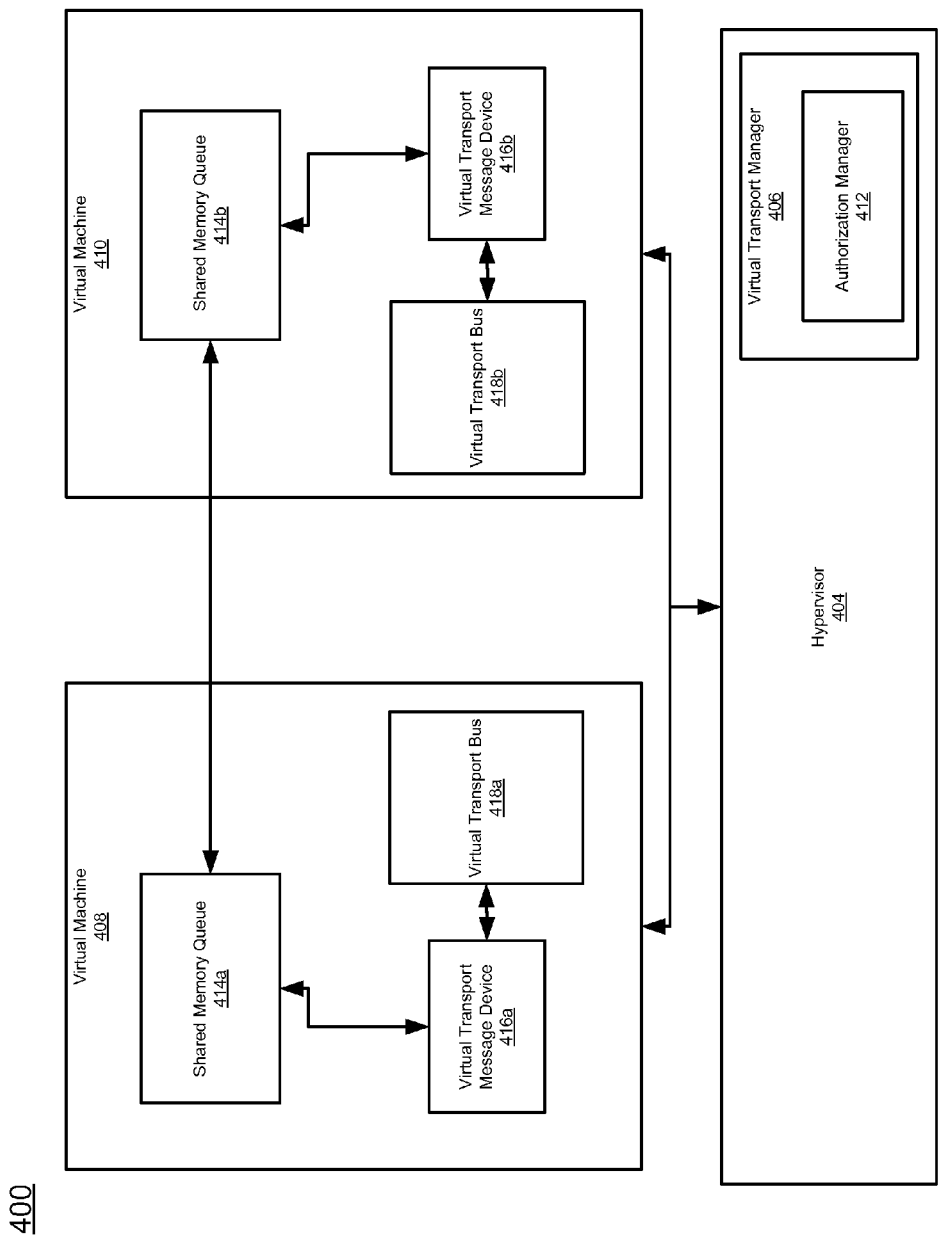
FIG. 4 shows a block diagram of exemplary guest components, in accordance with one embodiment of the present invention.
Figure 5:
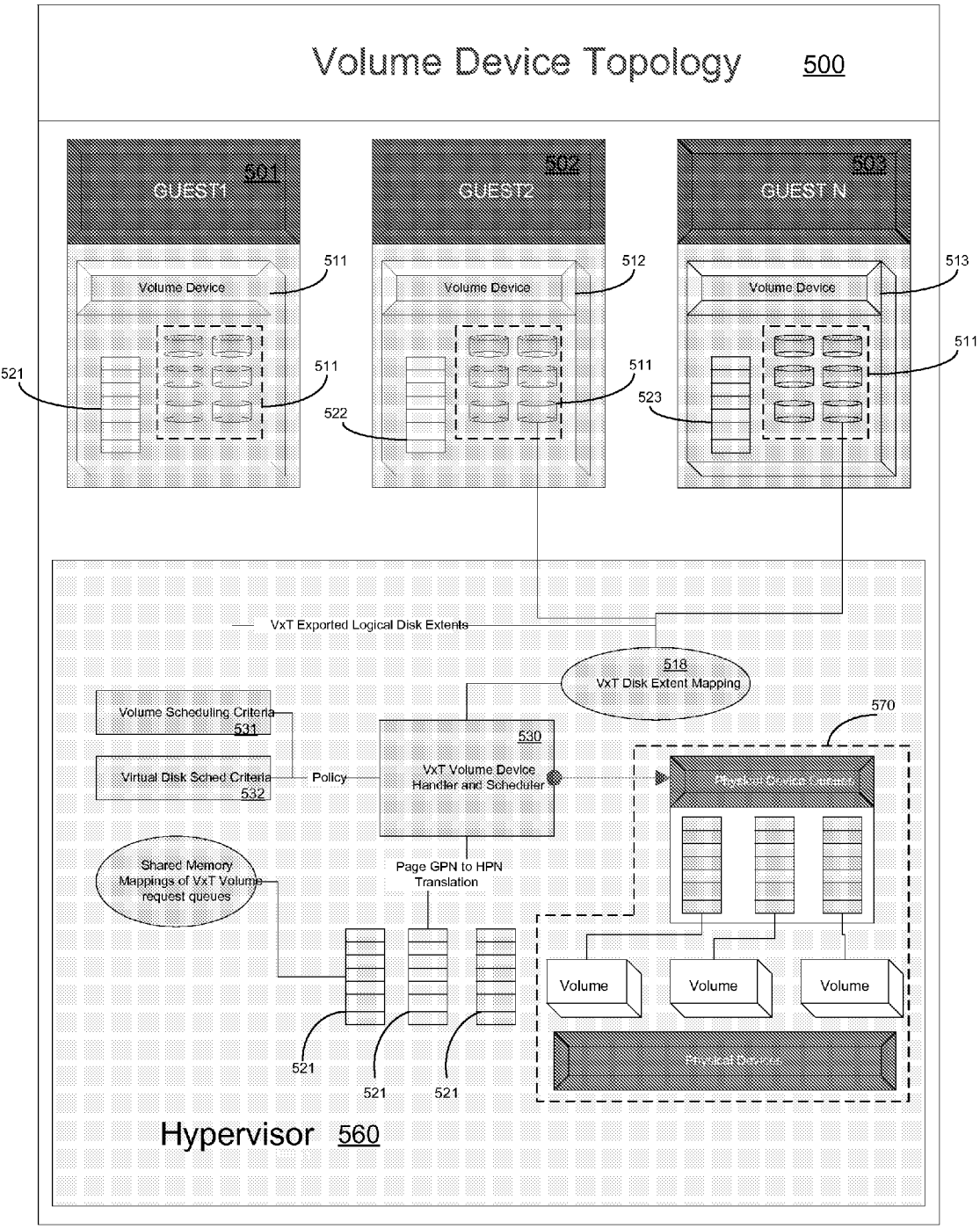
FIG. 5 shows an exemplary volume device topology in accordance with one embodiment of the present invention.

Exemplary operating embodiments of the present invention are now described. FIG. 2 describes an example operating environment. FIG. 3 and FIG. 4 describe an exemplary virtual transport bus functioning in conjunction with a virtual transport message device and a virtual transport manager. FIG. 5 describes an exemplary volume device topology.

With reference now to FIG. 2, FIG. 2 shows a block diagram of an exemplary operating environment, in accordance with one embodiment of the present invention. Exemplary operating environment 200 includes clients 202*a-c*, networks 204, servers 206*a-b*, storage area network (SAN) fabric 208, and storage arrays 210*a-b*. It is appreciated that that components of exemplary operating environment 200 are exemplary and more or fewer components may be present in various configurations. It is appreciated that operating environment may be part of a distributed computing environment, a cloud computing environment, a client server environment, etc.

Client systems 202*a-c* access information on storage arrays 210*a-b* via servers 206*a-b* using, for example, a web browser or other suitable client communication software (not shown). FIG. 2 depicts the use of a network 204 such as the Internet for exchanging data, but the present disclosure is not limited to the Internet or any particular network-based environment.

Each of servers 206a-b can have multiple clients (e.g., clients 202a-c) connected thereto. Servers 206a-b can be a variety of server types including, but not limited to, database servers, network file system (NFS) servers, and application servers (e.g., billing). For example, applications and servers might have thousands of people accessing them from different locations, thus the applications and servers need to be highly available and the cluster fault tolerant. In some embodiments, servers 206a-b have access to shared storage of storage arrays 210a-b with each of servers 206a-b having its own respective clustered file system and its own built-in lock manager thereby allowing servers 206a-b to access the shared storage. Each of servers 206a-b may communicate with each other over a network (e.g., a redundant private network) (not shown). Servers 206a-b may be linked to storage arrays 210a-b in a variety of ways including, fiber channel.

Servers 206a and 206c respectively execute virtual transport managers 212a-b which manage virtual transport and authorization of communication between virtual machines and virtual devices of servers 206a-c. Virtual transport managers 212a-b are further operable to abstract devices and other resources with respect to virtual machines on servers 206a-c. Virtual transport managers 212a-b may also present resources of from different servers to each of servers 206a-c. Each resource presented via virtual transport managers 212a-b in conjunction with virtual transport module 214 is treated as a remotable resource such that resource changes are transparent to virtual machines running on servers 206a-c.

Virtual transport manager 212b is communicatively coupled with virtual transport module 214. In one embodiment, virtual transport managers 212a-b are operable to manage and authorization virtual devices of other systems. For example, virtual transport manager 212b manages virtual transport and authorization of devices between virtual machines and virtual devices of server 206b via virtual transport module 214.

FIG. 3 shows a block diagram of an exemplary virtual environment, in accordance with one embodiment of the present invention. Exemplary virtual environment 300 includes hypervisor 304, virtual machines 308-312. Components of exemplary virtual environment 300 may execute on or otherwise be part of computing systems (e.g., servers 106a-c and computing system 1000).

Hypervisor 304 interfaces with hardware 302 (e.g., of servers 106a-c or computing system 1000) and provides resources and services to virtual machines 308-312. In one embodiment, hypervisor 304 is part of a trusted computing base (TCB). Hypervisor 304 includes virtual transport module 312 and virtual transport manager 306. Virtual transport manager 304 in conjunction with virtual transport 312 and virtual transport modules 314a-c, of virtual machines 308-312, provide abstractions including emulated devices of resources in hardware 302 to virtual machines 308-312.

In one embodiment, virtual transport module 312 and virtual transport manager 306 provide an independent input/output (IO) abstraction layer to model a physical IO bus substitute for virtual machines 308-312 which allows implementation of controls over IO abstraction layer. Virtual transport module 312 provides emulated devices or abstractions of resources of hardware 302. Virtual transport manager 306 and virtual transport module 312 support a variety of functions including data filtering, device remoting or provisioning, and security through authorization of connections between virtual machines 308-312 and abstractions of resources of hardware 302.

FIG. 4 shows a block diagram of exemplary guest components, in accordance with one embodiment of the present invention. Diagram 400 includes hypervisor 404 and virtual machines 408-410. Hypervisor 404 includes virtual transport manager 406. In one embodiment, hypervisor 404 is part of a trusted computing base (TCB).

Virtual transport manager 406 includes authorization manager 412. Guests 408 and 410 includes shared memory queues 414a-b, virtual transport message devices 416a-b, and virtual transport bus modules 418a-b, respectively. The virtual transport buses 418a-b provide traditional device discovery mechanisms to facilitate the incorporation of different sorts of virtual devices. Shared memory abstractions for I/O transport enhance the definition of communication for a device, enabling transparent substitution of the method of transport. (e.g., virtual transport devices 416a-b). In one embodiment, the virtual transport bus modules 418a-b are embedded in hypervisor 404 and are part of the trusted computing based (TCB). Guests 408-410 communicate via shared memory queues 414a-b after authorization manager 412 checks whether virtual transport message devices 416a-b are allowed to communicate.

Virtual transport manager 406 provides for a virtual transport and bus subsystem that plugs into hypervisor 404. The subsystem provides a means to create emulated devices based on any subset of resources available in the hypervisor 404 and presents these devices to virtual machines 408 and 410. Endpoints (e.g., virtual machines 408-410) are able to request connections allowing the support of services as well as traditional bus plug events.

Virtual transport manager 406 presents device emulations to virtual machine operating systems in the form of pluggable devices. The emulated devices can be identified, constructed, authorized and configured. These devices can be dynamically attached during runtime at the request of the guest or at the request of a remote endpoint trying to connect to the guest. Either end point is free to refuse a connection.

In one embodiment, the virtual transport manager 406 provides a mechanism to download device emulation libraries. Device emulation libraries can be downloaded at anytime in the virtual machine lifecycle. Device emulation libraries come with virtual device identifiers that are passed during virtual transport bus discovery, thereby making it possible for purpose built drivers in a virtual machine to be loaded.

In one embodiment, virtual machine 408 makes an instantiation request to virtual transport bus module 418a. The request has parameters including for device type (e.g., virtual transport message device), and end points (e.g., virtual machines 408 and 410). In one embodiment, the request goes on the virtual transport bus configuration queue. Device instantiation requests or device plug events can be initiated by virtual transport manager 406 or the virtual machines 408 and 410. In this way, a virtual machine can request a connection to an endpoint with a particular set of properties. An endpoint can be another guest, or a piece of hardware abstracted by virtual transport manager 406. The ability of endpoints to initiate a plugging event allows for supporting of dynamic service attachment. In one embodiment, instantiation requests require a response and no instantiation request can be made while one is outstanding. Thereby, in this way lock-step state update is assured and either side can start a configuration action with stale information with respect to earlier requests.

The authorization manager 406 provides a front end to manage resource allocation and communication channels for a virtual machine and a back end that operates in conjunction with a virtual transport bus. Virtual transport bus 418a signals authorization manger 412 with the request parameters to determine if the two end points are authorized to communicate. Authorization manager 412 checks for an authorization record that matches device type and end points. In one embodiment, authorization records allow authorization manager 406 to provide mandatory access control that is not tied to a specific hypervisor implementation or interface and independent of external hypervisor specific virtual machine interfaces. Authorization records may include routing information, security characteristics of endpoints, quality of service (QoS) characteristics, throughput requirements, and latency requirements.

The endpoints or virtual machines are identified by universally unique identifier (UUID) which allows authorization manager 406 to manipulate virtual machines within a security context. Authorization manger 406 can also check for connection to remote services and devices and thereby supports automatic routing. As described further herein, the authorization manager 406 is capable of determining whether data filtering is necessary to ensure maintain desired security levels.

In one embodiment, authorization manager 412 is separate entity that has a cache local in the trusted computing base and has access out of the local trusted computing base. The authorization manager 412 may be co-resident or attached across a secure channel to virtual transport manager 406.

As further described herein, authorization manager 412 is operable to manage device connections for a virtual machine and provisioning of devices. Instantiation may be initiated at the end points (e.g., virtual machines) but provisioning is ultimately controlled through the authorization manager 412.

Upon a match of the parameters of the request with an authorization record, the connection is approved. Authorization manager 412 shall deny all access that is not explicitly requested. Accordingly, authorization manager 412 allows access based on if there is an explicit record indicating the guest and its remote endpoints and the particular type of device are accepted. This allows authorization manager 412 to setup and implement of various levels of mandatory access control. Thus authorization manager 412 can provide mandatory access control for the connections of virtual transport devices and services. The authorization manager may allow multiple instances of connections to occur that fall within authorized activities of a single authorization record so long as the cumulative resource consumed by these instances does not exceed the resource authorized. This allows for the carving up of a connection resource to meet dynamic demands of guest clients between two endpoints.

The connection authorization allows virtual machines 408 and 410 to communication via shared memory queues 414a-b. In one embodiment, shared memory queues 414a-b represent a single portion of shared memory used by virtual machines 408 and 410 to communicate. In one embodiment, the virtual transport bus emulation is resident in the hypervisor and made visible to the guest via a virtual transport device (e.g., virtual transport message device 416a) plugged into the virtual machine's system bus.

FIG. 5 shows an exemplary volume device topology 500 in accordance with one embodiment of the present invention. As depicted in FIG. 5, the volume device topology 500 shows a first guest 501, a second guest 502 and an "Nth" guest 550. Each of the guests are shown residing on a hypervisor 560.

The Volume Request Queue

In the FIG. 5 embodiment, each of the guests includes a respective volume device 511-513. The volume device includes layout descriptors 515-517 that are exported logical disk extents that describe the underlying topology of the volume via the virtual transport disk extent mapping 518, as shown. This enables each virtual transport volume device client to know the layout of its volumes. The inclusion of the volume devices 511-513 directly within the guests enables each virtual transport volume device client to send its I/O requests in the form of volume writes and reads. This is very different than, for example, broken out disk commands. This aspect delays the commitment to individual disk access scheduling choices. The scheduling is then done by the virtual transport volume device handler and scheduler 530 (or volume device manager 530), which can reconcile the guest request with that of other guests and see to it that the individual disk accesses associated with a single request are coordinated.

The volume device manager 530 is resident in the hypervisor and close to the physical resource allowing for direct manipulation of disk scheduling criteria 532. This works in conjunction with a policy that is based on volume scheduling criteria 531. This will allow tighter QOS (quality of service) policies for individual guests, and higher overall throughput. This solves issues such as hung volume I/O where a guest I/O can hang waiting for a single busy disk because disk scheduling is reconciled with volume request scheduling.

In this manner, the volume device manager 530 pools requests from the guests and executes them in an optimal manner on the physical hardware 560 of the storage devices. This aspect ensures that all hardware transport and offload options are preserved. By pooling the requests in this way the volume device handler and scheduler 530 is free to choose when it translates a volume request into disk requests and whether it does an entire request at once or interleaves portions of it with other volume requests. Further, it can guarantee the timely completion of related disk I/O's. This is impossible with disassociated disk and volume scheduling.

It should be noted that the use of volume requests has another significant advantage in that the number of completion I/O's is reduced to no more than one for a volume request. Since completion interrupts translate into context switches between the hypervisor and the guest, this can be significant. Virtual transport volume devices in accordance with embodiments of the present invention have another advantage. Because of the streaming I/O option, guests streaming I/O can avoid completion interrupts and request signaling altogether. The virtual transport queue streaming technique and the fact that all guest requests are handled by one volume device daemon allows for the elimination of the I/O request signal on systems sustaining I/O from one or more guests. Thus, the virtual transport queue streaming technique allows for the elimination of completion I/O's for a guest experiencing streaming I/O.

It is also expected that the virtual transport clients will use virtual transport indirect data queues, such as the queues 521-526. This will allow a client to take advantage of the virtual transport queue library abstraction. In one embodiment, virtual transport queues are all accessed via a set of common verbs such as get, put and signal. This allows the internal layout of a queue to remain hidden.

In one embodiment, the virtual transport queues come in two general types, direct and indirect. In the indirect case, the data has an additional format that is known to the queue verbs. This format allows the queue implementation to recognize pointers to data. Based on this mechanism the virtual transport bus can undertake the translation from virtual to physical addresses. Virtual transport queue type is negotiated as a part of device initialization. When appropriate hardware support is available, the guest physical to virtual translation can be skipped and the hardware will handle the translations (e.g., Advanced IOMMU/IOV support). In other cases the queue type that explicitly sets up physical s/g lists will be used.

Intrinsic Remote Device Support

Embodiments of the present invention enable intrinsic remote device support. For example, once a volume device is written, it can be made to work on a local platform or across a communication network. This is because the virtual transport device object abstracts transport.

For example, in one embodiment, in the same way that services can be moved from a remote to a local port in a TCP/IP networking context. Virtual transport device emulations may be moved. This has profound ramifications for how a volume management architecture can be arranged. The virtual transport volume device acts on resources via local disk devices, networking, IB, or fiberchannel. The virtual transport volume device communicates to its clients via virtual transport queues (e.g., queues 521-526). These queues may be built on shared memory, emulated shared memory, or device memory. Based on this aspect, the virtual transport volume device may reside on the same box, reside on a remote box, be moved during fail-over of a master server, act as a remote utility server, be based on a traditional server, or be part of special physical hardware. All of these roles can be carried out without the knowledge or special provision of the volume manager implementation sitting behind the virtual transport device abstraction.

In one embodiment, it is particularly advantageous that in every case, the optimal conformation is achievable because of the reliance on the shared memory abstraction as the universal transport paradigm and the delayed disarticulation of the volume request. For example, implementation of the communication pipe on each physical stage of the journey will be optimized to the hardware available. The virtual transport architecture of embodiments of the present invention can be seen as functionally similar to networking in routing and its device centric architecture puts remote disk based storage on-par with file based storage and evens the playing ground in the distributed/virtualized data center.

Benefits in the Distributed Data Center

Embodiments of the present invention provide a number of benefits in the distributed data center. The virtual transport device container can provide shared memory transport queues, fast signals and device context. This context can include device attention status interrupts for plugging and change of state, objectified routing, security, and the full range of background system services. In short the virtual transport device container can shield all topology considerations from the virtual transport driver, save the quality of service characteristics. Because of this aspect, the device implementation may be located at a number of different places, within the same system as the guest driver, within a hypervisor on the same physical platform as a guest operating system containing the client, or across a network connection within any imaginable volume management utility.

From the client's perspective then, all that remains is how to pass the maximum amount of information on a request in the most compact way possible. For example, in one embodiment, one can take the existing volume manager and communicate at the traditional driver level. However, this is only the beginning. By substituting a virtual transport volume I/O request queue at the client request level, one can bring a unified architecture to the native platform as well. This aspect makes migration between guest virtual and native settings comparatively straightforward and yields a number of new opportunities.

For example, the management of storage resource and its organization into client visible volumes, the scheduling of I/O volume requests across myriad disk storage resources, and the tie-in with ancillary services such as de-dup and backup are certain functional elements are common volume management functional tasks. Conventionally, the differences in the implementation of these tasks are largely dictated by where they reside and where they are placed with respect to their clients and services. In a very advantageous manner, the virtual transport volume device architecture of the embodiments of the present invention can isolate the functional elements of storage management and provide a common framework within which to handle the distributed aspects of the data center.

In this manner, virtual transport volume device architectures of embodiments of the present invention provide a framework which can reconcile storage management of individuated servers and storage arrays, enabling them to work seamlessly with clients residing on virtual machines or on native platforms. Further, the virtual transport volume device based data center dovetails perfectly with file management and web services, riding either on top or as a component within.

Thus, embodiments of the present invention provide a mechanism that improves storage management control while at the same time delivering better performance and lower overhead on volume storage data traffic. The virtual transport volume device functionality is embodied in a driver and emulated device pair. The virtual transport volume device delivers its improvements by optimizing the communication path between the driver and the device emulation and by moving the runtime context of the volume to the emulated device space. Juxtaposition of volume and emulated device actions allows I/O scheduling decisions to be made synchronously with respect to physical device interaction. System events pushed into this hybrid environment can trigger direct actions on the motive elements of the I/O stack. The virtual transport volume device works in either a native setting or within a hypervisor. It essentially operates the same way in both environments, but offers significantly more benefit in the hypervisor setting where context switching overheads are substantially higher.

Figure 6:
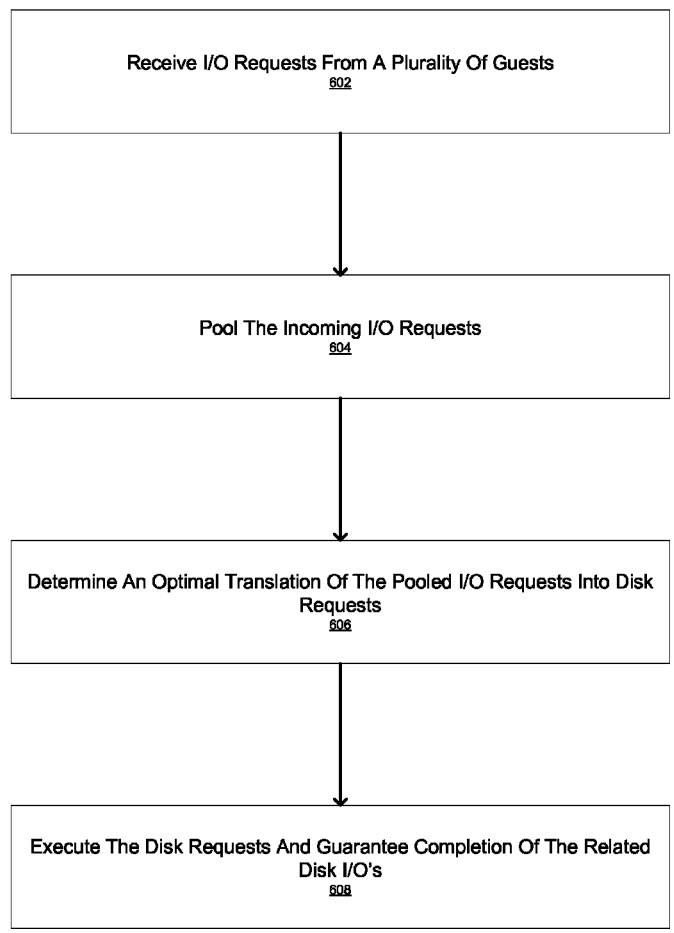
FIG. 6 shows a flowchart of the steps of an I/O pooling process in accordance with one embodiment of the present invention.

FIG. 6 shows a flowchart of the steps of an I/O pooling process 600 in accordance with one embodiment of the present invention. As depicted in FIG. 6, process 600 shows the exemplary operating steps performed by a volume device manager to pool I/O requests from multiple guests for optimal execution.

Process 600 begins in step 602, where the volume device manager (e.g., volume device handler in scheduler 530 of FIG. 5) receives a plurality of I/O requests from a plurality of guests. As described above, the inclusion of the volume devices (e.g., volume devices 511-513) directly within the guests enables each volume device client to send its I/O request in the form of volume writes and reads. In step 604, the incoming I/O requests are pooled. As described above, pooling delays the commitment to individual disk access scheduling choices.

In step 606, an optimal translation of the pooled our requests into disk requests is determined. The scheduling is then done by the volume device manager 530, which can reconcile the guest request with that of other guests and see to it that the individual disk accesses associated with a single request are coordinated. The volume device manager 530 works in conjunction with a policy that is based on volume scheduling criteria 531 and virtual disk scheduled criteria 532. Subsequently, in step 608, the disk requests are executed and the completion of the related disk I/O's is guaranteed by the volume device manager 530. In this manner, the volume device manager 530 can ensure such errors as hung volume I/O does not occur.

Figure 7:
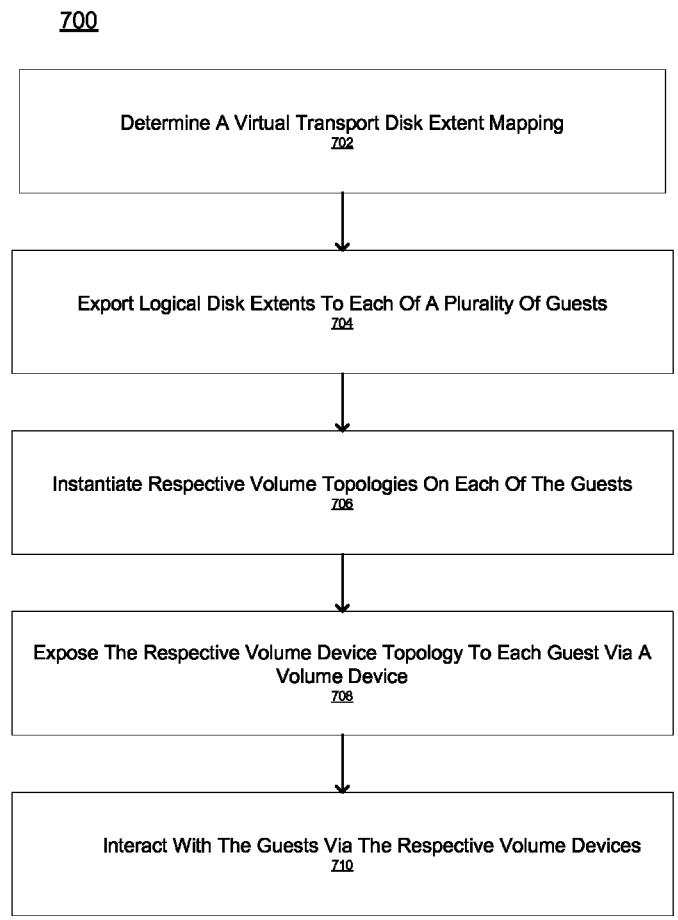
FIG. 7 shows a flowchart of the steps of a volume device topology exposure process in accordance with one embodiment of the present invention.

FIG. 7 shows a flowchart of the steps of a volume device topology exposure process 700 in accordance with one embodiment of the present invention. As depicted in FIG. 7, process 700 shows the exemplary operating steps performed in instantiating a volume device into guests and collaborating with the guest resident component to formulate a volume topology.

Process 700 begins in step 702, where a volume device manager (e.g., volume device manager 530 from FIG. 5) determines a virtual transport disk extent mapping (e.g., virtual transport disk extent mapping 518). In step 704, logical disk extents are exported to each of the plurality of guests. In step 706, respective volume topologies are collaboratively instantiated on each of the guests. In step 708, the respective volume device topologies are embodied in the volume device queue. As described above, the volume device includes layout descriptors (e.g., layout descriptors 515-517) that are exported logical disk extents that describe the underlying topology. In this way policy options are preserved for the guest, allowing it traditional control over volume management while gaining the advantages of aggregated I/O requests. Subsequently, in step 710, the applications, operating systems, or the like interact with the volume storage via the respective volume devices.

Figure 8:
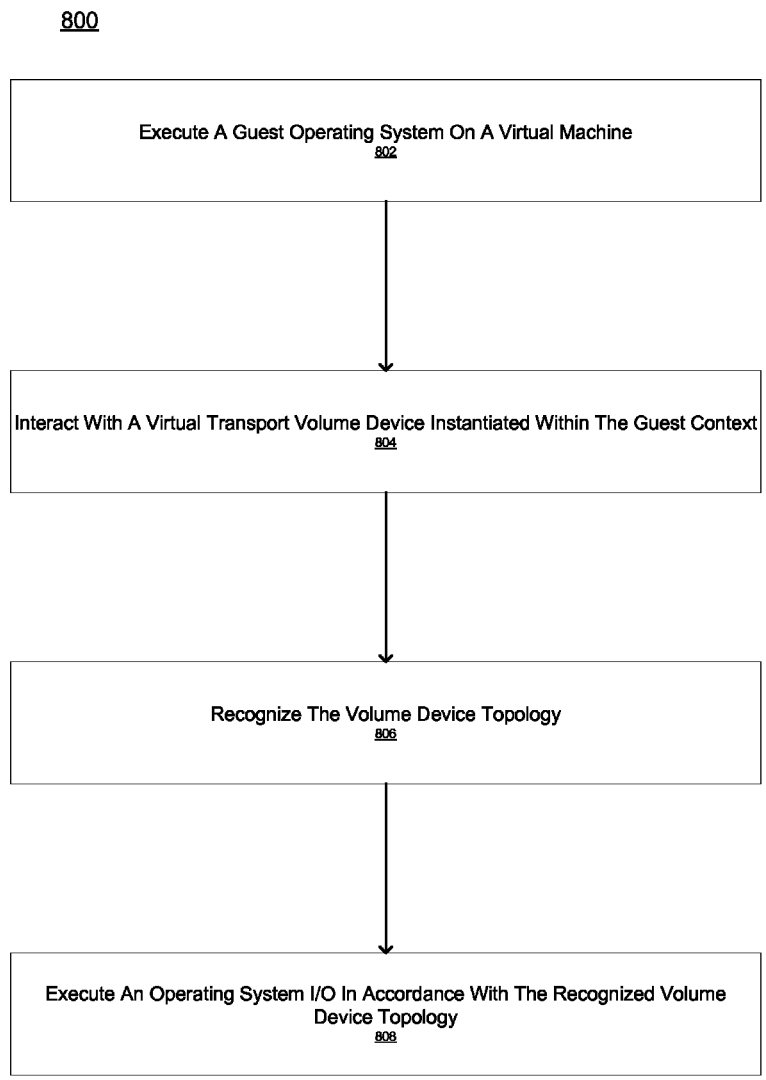
FIG. 8 shows a flowchart of the steps of an operating system I/O execution process in accordance with one embodiment of the present invention.

FIG. 8 shows a flowchart of the steps of an operating system I/O execution process 800 in accordance with one embodiment of the present invention. As depicted in FIG. 8, process 800 shows the exemplary operating steps performed in executing an operating system I/O in accordance with a recognized volume device topology.

Process 800 begins in step 802, where a guest operating system executes on a virtual machine. In step 804, the guest operating system (e.g., guest operating system 116 of FIG. 1) interacts with a volume device (e.g., volume device 112) instantiated within the guest context. In step 806, upon interaction, the guest operating system recognizes the volume device topology. As described above, the participation of the volume component in the guest with the layout of the volume and its shared knowledge of its topology with the volume manager ensures policy options are preserved for the guest, allowing it traditional control over volume management while gaining the advantages of aggregated I/O requests. Subsequently, in step 808, the operating system I/O is executed in accordance with the recognized volume device topology.

Figure 9:
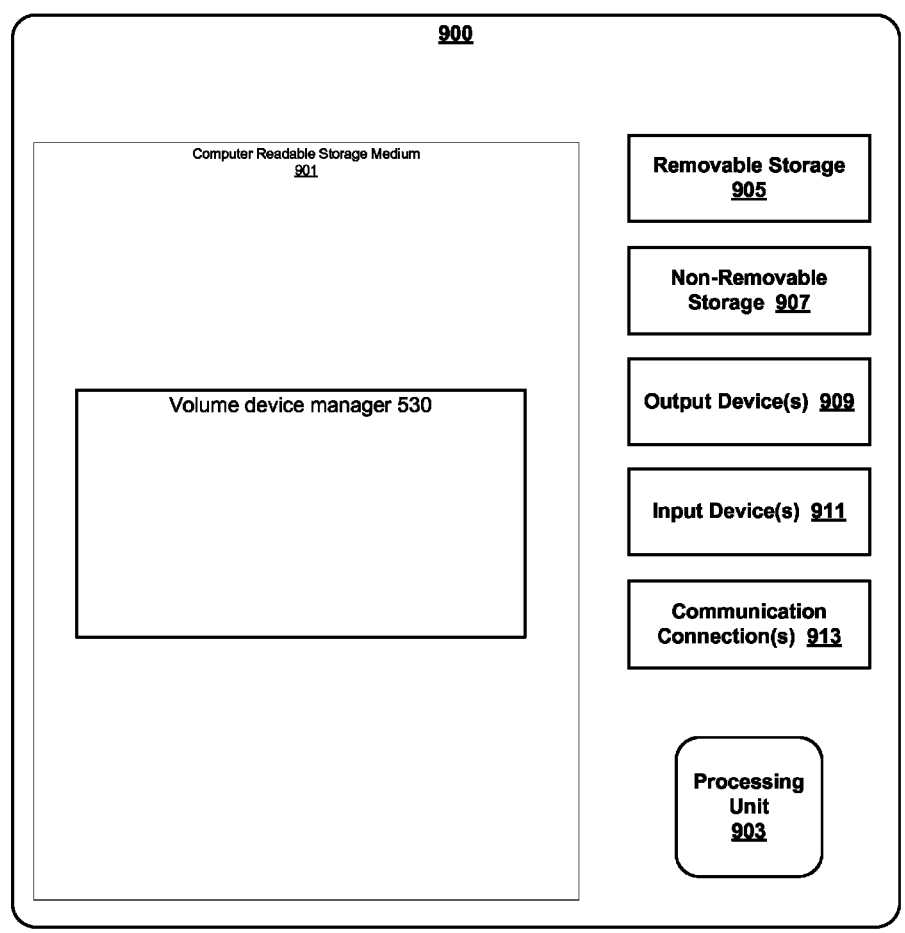
FIG. 9 shows an exemplary computer system according to one embodiment.

FIG. 9 shows an exemplary computer system 900 according to one embodiment. Computer system 900 depicts the components of a basic computer system providing the execution environment for certain hardware-based and software-based functionality for the above described embodiments. For example, computer system 900 can be a system upon which the volume device manager 530 and one or more software stacks from FIG. 5 are instantiated. Computer system 900 can be implemented as, for example, a server computer system, workstation computer system, desktop computer system, or laptop computer system. Similarly, computer system 900 can be implemented as a handheld device. Computer system 900 typically includes at least some form of computer readable media (e.g., computer readable storage medium 901). Computer readable media can be a number of different types of available media that can be accessed by computer system 900 and can include, but is not limited to, computer storage media.

In its most basic configuration, computer system 900 typically includes processing unit 903 and a computer readable storage medium 901. Depending on the exact configuration and type of computer system 900 that is used, memory 901 can be volatile (e.g., such as DRAM, etc.), non-volatile (e.g., such as ROM, flash memory, etc.) or some combination of the two. Similarly, the memory 901 can comprise other devices besides solid-state devices, such as, for example, magnetic disk-based media, optical media, or the like.

Additionally, computer system 900 can include other mass storage systems (e.g., removable 905 and/or non-removable 907) such as magnetic or optical disks or tape. Similarly, computer system 900 can include input devices 911 and/or output devices 909 (e.g., such as a display). Computer system 900 can further include communication connections 913 to other devices, computers, networks, servers, etc. using either wired or wireless media. As all of these devices are well known in the art, they need not be discussed in detail.

It should further be noted, that the computer system 900 can have some, most, or all of its functionality supplanted by a distributed computer system having a large number of dispersed computing nodes, such as would be the case where the functionality of the computer system 900 is partly or wholly executed using a cloud computing environment.

Figure 10:
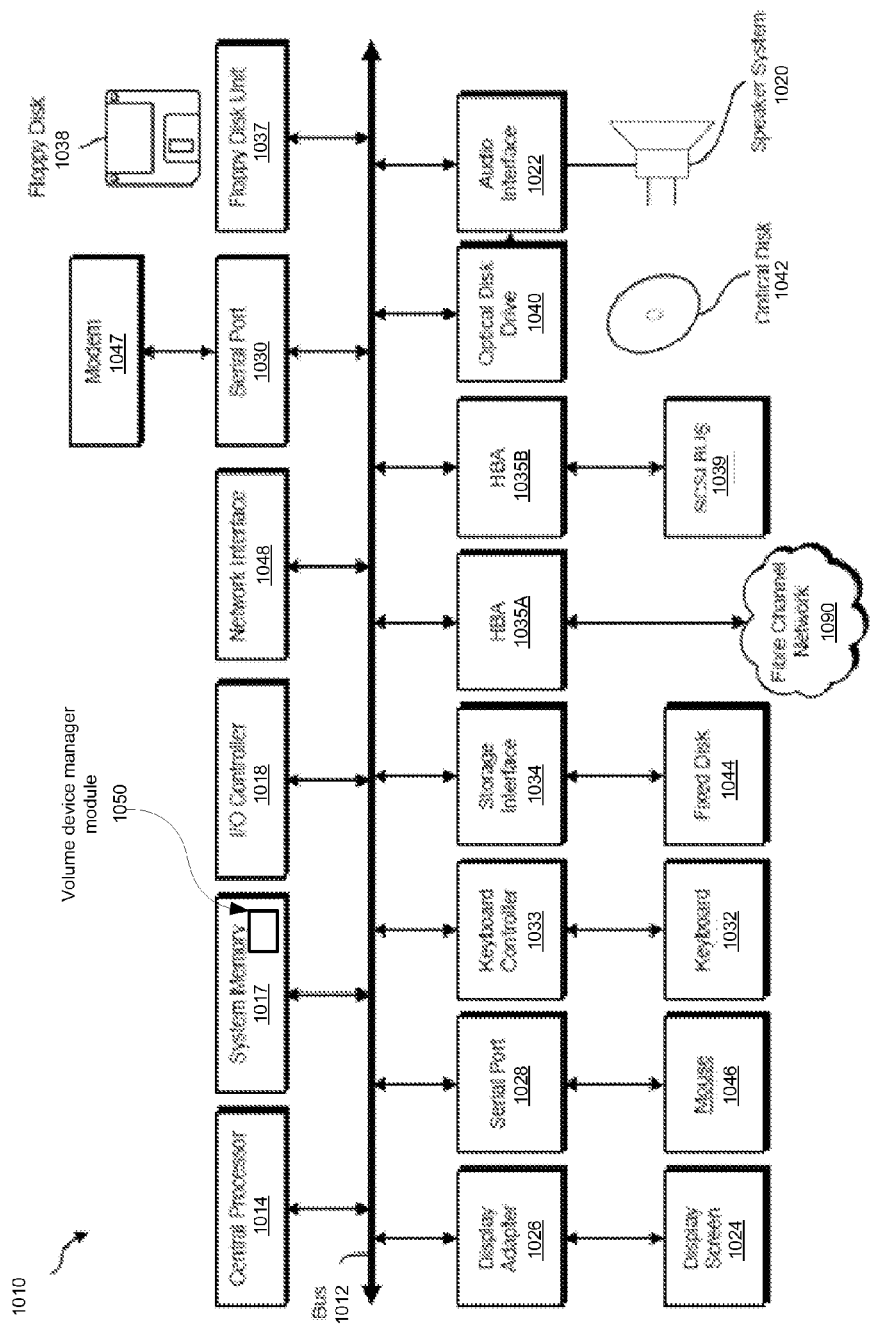
FIG. 10 depicts a block diagram of a computer system suitable for implementing certain functionality in accordance with one embodiment of the present invention.

FIG. 10 depicts a block diagram of a computer system 1010 suitable for implementing certain functionality in accordance with one embodiment of the present invention. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fiber Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. In the FIG. 10 embodiment, the system memory 1017 instantiates a volume device manager module 1050 which implements the virtual transport volume device functionality described above. The ROM or flash memory can contain, among other code, the Basic Input-Output system (BIOS) which controls basic hardware operation such as the interaction with peripheral components. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code to implement the present disclosure can be stored in computer-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A volume manager I/O method, comprising:
   determining a storage extent mapping of storage functionality of a storage resource;
   generating a logical disk extent based on the storage extent mapping;
   exporting the logical disk extent to a volume device component that is communicatively coupled to implement I/O for an application
   receiving an I/O request from the application via the volume device component; and
   executing the I/O request in accordance with the logical disk extent.

2. The method of claim 1, wherein the logical disk extent is used to export volume layout information to the application.

3. The method of claim 2, wherein the volume layout information comprises one or more volume policy options.

4. The method of claim 1, wherein the volume device component is a virtual transport bus volume device component.

5. The method of claim 1, wherein I/O requests are received from a plurality of different applications via a corresponding plurality of volume device components, and wherein the plurality of I/O requests are pooled to implement an optimal overall I/O scheduling.

6. The method of claim 5, wherein the optimal overall I/O scheduling is based on knowledge of each of the volume device components and knowledge of a physical resource topology of the storage resource.

7. The method of claim 5, wherein the optimal overall I/O scheduling is based on a provisioning policy, and wherein the provisioning policy is operable for alteration via real-time management input.

8. The method of claim 1, wherein I/O signal requests and data completion interrupts are suppressed while executing a plurality of I/O request to implement streaming I/O.

9. The method of claim 1, wherein a shared memory is used to implement a plurality of queues to support input and output between for context of the application.

10. A computer readable non-transitory storage medium having stored thereon, computer executable instructions that, if executed by a computer system cause the computer system to perform a method comprising:
    instantiating a volume device manager within a hypervisor context;
    determining a storage extent mapping of storage functionality of storage resources;
    generating a plurality of logical disk extents based on the storage extent mapping;
    exporting the logical disk extents from the volume device manager to a plurality of volume device components that are communicatively coupled to implement I/O for a plurality of applications, wherein the volume device components and the applications execute as respective virtual machine guests;
    receiving a plurality of I/O request from the applications via the volume device components;
    pooling the I/O requests to implement an optimal overall I/O scheduling; and
    executing the I/O requests in accordance with the I/O scheduling.

11. The computer readable storage medium of claim 10, wherein the logical disk extent is used to export volume layout information to the virtual machine guests.

12. The computer readable storage medium of claim 11, wherein the volume layout information comprises one or more volume policy options.

13. The computer readable storage medium of claim 10, wherein each of the volume device components are virtual transport bus volume device components.

14. The computer readable storage medium of claim 10, wherein the optimal overall I/O scheduling is based on knowledge of each of the volume device components and knowledge of a physical resource topology of the storage resources.

15. The computer readable storage medium of claim 10, wherein I/O signal requests and data completion interrupts are suppressed while executing a plurality of I/O request to implement streaming I/O.

16. The computer readable storage medium of claim 10, wherein a shared memory is used to implement a plurality of queues to support input and output between a plurality of contexts of the virtual machine guests.

17. A volume device manager system, comprising:
 a computer system having a processor coupled to a computer readable storage media and executing computer readable code which causes the computer system to implement a volume device manager, wherein the volume device manager:
 instantiates a volume device manager within a hypervisor context;
 determines a storage extent mapping of storage functionality of storage resources;
 generates a plurality of logical disk extents based on the storage extent mapping;
 exports the logical disk extents from the volume device manager to a plurality of volume device components that are communicatively coupled to implement I/O for a plurality of applications, wherein the volume device components and the applications execute as respective virtual machine guests;
 receives a plurality of I/O request from the applications via the volume device components;
 pools the I/O requests to implement an optimal overall I/O scheduling; and
 executes the I/O requests in accordance with the I/O scheduling.

18. The system of claim 17, wherein each of the volume device components are virtual transport bus volume device components.

19. The system of claim 17, wherein the optimal overall I/O scheduling is based on knowledge of each of the volume device components and knowledge of a physical resource topology of the storage resources.

20. The system of claim 17, wherein I/O signal requests and data completion interrupts are suppressed while executing a plurality of I/O request to implement streaming I/O.

* * * * *